(12) United States Patent
Fritz-Langhals et al.

(10) Patent No.: US 12,466,920 B2
(45) Date of Patent: Nov. 11, 2025

(54) ALKYL SILIKATE

(71) Applicant: Wacker Chemie AG, Munich (DE)

(72) Inventors: Elke Fritz-Langhals, Ottobrunn (DE); Richard Weidner, Burghausen (DE)

( * ) Notice: Subject to any disclaimer, the term of this patent is extended or adjusted under 35 U.S.C. 154(b) by 529 days.

(21) Appl. No.: 18/016,694

(22) PCT Filed: Jul. 22, 2020

(86) PCT No.: PCT/EP2020/070678
§ 371 (c)(1),
(2) Date: Jan. 18, 2023

(87) PCT Pub. No.: WO2022/017598
PCT Pub. Date: Jan. 27, 2022

(65) Prior Publication Data
US 2023/0272166 A1  Aug. 31, 2023

(51) Int. Cl.
*C08G 77/02* (2006.01)

(52) U.S. Cl.
CPC ................. *C08G 77/02* (2013.01)

(58) Field of Classification Search
CPC .................................................. C08G 77/02
See application file for complete search history.

(56) References Cited

U.S. PATENT DOCUMENTS

| | | | | |
|---|---|---|---|---|
| 2,643,263 | A * | 6/1953 | Morgan | C07F 7/04 252/78.3 |
| 2,758,127 | A | 8/1956 | Goldschmidt et al. | |
| 3,027,394 | A * | 3/1962 | Pierce, Jr. | C07F 7/04 252/78.3 |
| 3,223,342 | A * | 12/1965 | Brandon | G11B 15/674 242/586.6 |
| 6,005,132 | A * | 12/1999 | Weidner | C07F 7/04 556/483 |
| 2004/0072704 | A1 * | 4/2004 | Gerke | A61Q 13/00 510/101 |
| 2004/0127363 | A1 * | 7/2004 | Guzman | C07F 7/0838 504/193 |
| 2017/0210763 | A1 * | 7/2017 | Krafczyk | C08G 77/08 |

FOREIGN PATENT DOCUMENTS

| | | | | |
|---|---|---|---|---|
| EP | 3351547 | A1 * | 7/2018 | ........... C07F 7/04 |
| GB | 709346 | A * | 5/1954 | ........... C07F 7/04 |
| JP | 2017137485 | A | 8/2017 | |
| JP | 2017197521 | A | 11/2017 | |

OTHER PUBLICATIONS

Journal of Cultural Heritage (2025) 72, 205-216.*
"Synthesis of Alkoxy Sllanols and Siloxanes" authored by Morgan et al. and published in JACS (1951), 73, 5193-95.*
Abe Yoshimoto et al.: "Alkoxysilanes. II. Preparation of (tributoxysiloxy)chlorosilanes and silanols, and their polymeric substances", Bulletin of the Chemical Society of Japan, vol. 42, No. 4, Apr. 1, 1969 (Apr. 1, 1969), pp. 1118-1123, XP009102304, ISSN: 0009-2673.
Okawara Rokuro et al: "Isopropoxypolysiloxanes", Bulletin of the Chemical Society of Japan, vol. 27, No. 1, Jan. 1, 1954 (Jan. 1, 1954), pp. 45-46, XP055793773, ISSN:0009-2673.
Okawara Rokuro et al: "Alkylalkoxypolysiloxanes. II. Ethylisopropoxypolysiloxanes", Bulletin of the Chemical Society of Japan, vol. 27, No. 9, Sep. 1, 1954 (Sep. 1, 1954), pp. 582-585, XP055793771, ISSN: 0009-2673.

* cited by examiner

*Primary Examiner* — Marc S Zimmer

(57) ABSTRACT

Alkyl-silicates and alkyl-silicate-containing organosilicon compounds. The alkyl-silicate-containing organosilicon compound includes at least 90% by weight, preferably at least 95% by weight, of alkyl silicates of average formula (I)

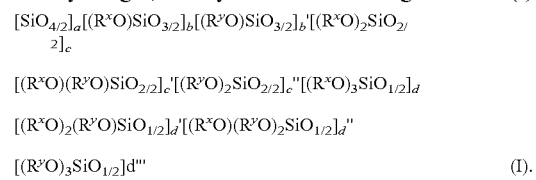

(I).

Where the radicals $R^x$ are each independently selected from radicals that meet at least one of the following conditions: (a) where $R^x$ is a substituted or unsubstituted, $C_4$-$C_{20}$ hydrocarbon radical that is branched at the α-carbon atom, (b) where $R^x$ is a substituted or unsubstituted, $C_5$-$C_{20}$ hydrocarbon radical that is doubly branched at the β-carbon atom, and/or (c) where $R^x$ is an unsubstituted or alkyl-substituted cyclopentyl, cyclohexyl or cycloheptyl radical having a total of not more than 9 carbon atoms. Where the radicals $R^y$ are each independently selected from (i) hydrogen, (ii) methyl radical, and (iii) ethyl radical.

12 Claims, No Drawings

ALKYL SILICATE

CROSS-REFERENCE TO RELATED APPLICATIONS

This application is a U.S. National Phase application of PCT Application No. PCT/EP2020/070678 filed on Jul. 22, 2020 the disclosure of which is incorporated by reference herein in its entirety.

The invention relates to novel alkyl silicates of average formula (I).

Silicones are a technically very important product class that are used in numerous fields of technology. Technically important properties of silicones are for example their low surface tension and their low tendency to crystallize, which distinguishes silicones from carbon-based polymers. Silicones remain liquid over wide temperature ranges and have very low glass transition temperatures.

However, the Si-alkyl groups that they contain mean that silicones do not break down at all readily in the environment. This characteristic is placing increasing restriction on the possible uses for silicones. There is accordingly a steadily growing demand for alternative materials that can in principle undergo hydrolytic cleavage but nevertheless have sufficient hydrolytic stability for practical uses and which are able to replace conventional silicones.

The object of the invention is therefore to find materials that do not contain any persistent Si—C bonds but nevertheless have properties such as glass transition temperature, surface tension, density and hydrophobic behavior similar to those of silicones and are therefore able to replace silicones.

RU 2263115 C1 discloses alkyl silicates of general formula $H_5C_2O$—$[(OC_2H_5)_2SiO]_{n-x}[(OR)_2SiO]_x$—$C_2H_5$, where n=3, 4 or 5 and x=1-6 and wherein the radicals R are identical or different radicals selected from the group consisting of 2-phenylethyl radical, cinnamyl radical, thymyl radical, vanillyl radical, 5-formylphenyl radical, eugenyl radical, santalyl radical and santalidyl radical, menthyl radical, and isobutyl radical. These compounds are useful as modifiers for textiles.

Abe et al., Bull. Soc. Chim. 1969, 42, 1118 discloses a process for preparing tributoxysiloxysilanols of formula $[(BuO)_3SiO]_xSi(OH)_y$, where x=2 for Bu=tert-butyl or x=2 or 3 for Bu=2-butyl, y=4-x. For these compounds, this results in a molar proportion of radicals $R^y$=H of up to 50 mol % based on the total of all alkyl radicals.

U.S. Pat. No. 2,758,127 discloses a process for preparing alkyl silicates of general formula R—$[(OR)_2SiO]_x$—OR, where x=2, 3 or 4 and wherein the radicals R are in each case an alkyl radical having 3 to 12 carbon atoms.

There is thus still the need to provide further alkyl silicates and especially ones that are stable to hydrolysis.

This object is achieved by the novel alkyl silicates of claims 1-7.

The invention provides alkyl-silicate-containing organosilicon compounds that contain at least 90% by weight, preferably at least 95% by weight, of alkyl silicates of average formula (I)

$$[SiO_{4/2}]_a[(R^xO)SiO_{3/2}]_b[(R^yO)SiO_{3/2}]_{b'}[(R^xO)_2SiO_{2/2}]_c$$

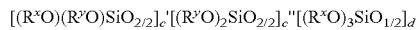

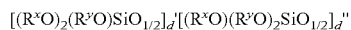

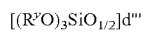    (I), wherein the indices a, b, b', c, c', c", d, d', d", d'" indicate the average content of the respective structural unit in the compound and are each independently a number within a range from 0 to 100 000, with the proviso that the sum of the indices is at least 2;

and wherein the radicals $R^x$ are each independently selected from radicals that meet at least one of the following conditions:

(a) $R^x$ is a substituted or unsubstituted, $C_4$-$C_{20}$ hydrocarbon radical that is branched at the α-carbon atom, (b) $R^x$ is a substituted or unsubstituted, $C_5$-$C_{20}$ hydrocarbon radical that is doubly branched at the β-carbon atom, (c) $R^x$ is an unsubstituted or alkyl-substituted cyclopentyl, cyclohexyl or cycloheptyl radical having a total of not more than 9 carbon atoms;

and where substituted in each case means that the hydrocarbon radical has at least one functional group selected from the group consisting of vinyl radical, ethynyl radical, amino radical, epoxy radical, thiol radical, and carbinol radical;

and wherein the radicals $R^y$ are each independently selected from the group consisting of (i) hydrogen, (ii) methyl radical, and (iii) ethyl radical;

with the proviso that the molar proportion of all radicals $R^y$ in the alkyl silicate is within a range from 0.1 to 20 mol %, preferably within a range from 1 to 15 mol %, wherein the molar proportion for $R^y$=(i) hydrogen is not more than 9 mol %, preferably not more than 5 mol %, in each case based on the molar amount of the sum of all radicals $R^x$ and $R^y$, and with the proviso that the alkyl-silicate-containing organosilicon compounds contain no SiC-bonded radicals.

Preference is given to alkyl silicates of average formula (I)

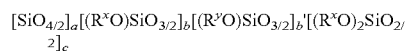

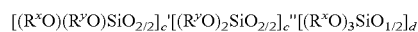

$$[(R^yO)_3SiO_{1/2}]d'''$$    (I), wherein the indices a, b, b', c, c', c", d, d', d", d'" indicate the average content of the respective structural unit in the compound and are each independently a number within a range from 0 to 100 000, with the proviso that the sum of the indices is at least 2;

and wherein the radicals $R^x$ are each independently selected from radicals that meet at least one of the following conditions:

(a) $R^x$ is a substituted or unsubstituted, $C_4$-$C_{20}$ hydrocarbon radical that is branched at the α-carbon atom, (b) $R^x$ is a substituted or unsubstituted, $C_5$-$C_{20}$ hydrocarbon radical that is doubly branched at the β-carbon atom, (c) $R^x$ is an unsubstituted or alkyl-substituted cyclopentyl, cyclohexyl or cycloheptyl radical having a total of not more than 9 carbon atoms;

and where substituted in each case means that the hydrocarbon radical has at least one functional group selected from the group consisting of vinyl radical, ethynyl radical, amino radical, epoxy radical, thiol radical, and carbinol radical;

and wherein the radicals $R^y$ are each independently selected from the group consisting of (i) hydrogen, (ii) methyl radical, and (iii) ethyl radical;

with the proviso that the molar proportion of all radicals $R^y$ in the alkyl silicate is within a range from 0.1 to 20 mol %, preferably within a range from 1 to 15 mol %, wherein the molar proportion for $R^y$=(i) hydrogen is not more than 9 mol %, preferably not more than 5 mol %, in each case based on the molar amount of the sum of all radicals $R^x$ and $R^y$.

The term "branched" means that there are two carbon radicals on a carbon atom.

The term "doubly branched" means that there are three carbon radicals on a carbon atom.

Preferably, the radicals $R^y$ are each independently a (ii) methyl radical or (iii) ethyl radical.

Preferably, the radicals $R^x$ are each independently selected from radicals that meet at least one of the following conditions:

(a) $R^x$ is a substituted or unsubstituted $C_4$-$C_{10}$ hydrocarbon radical that is branched at the α-carbon atom, in particular a substituted or unsubstituted aliphatic $C_4$-$C_{10}$ hydrocarbon radical that is branched at the α-carbon atom, (b) $R^x$ is a substituted or unsubstituted $C_5$-$C_{10}$ hydrocarbon radical that is doubly branched at the β-carbon atom, in particular a substituted or unsubstituted aliphatic $C_5$-$C_{10}$ hydrocarbon radical that is doubly branched at the β-carbon atom, (c) $R^x$ is an unsubstituted or alkyl-substituted cyclohexyl radical having a total of not more than 9 carbon atoms.

Examples of radicals $R^x$ are the 2-butyl radical, the 3-methyl-2-butyl radical, the 3-methyl-2-pentyl radical, the 3-pentyl radical, the 2-hexyl radical, the 3-hexyl radical, the 2-heptyl radical, the 2-octyl radical, the 1-phenylethyl radical, the 1-phenyl-1-propyl radical, the 2,2-dimethyl-1-propyl radical, the 1,1-dimethylethyl radical, the 1,1-dimethylpropyl radical, the cyclohexyl radical, the 3,3,5-trimethylcyclohexyl radical, the cyclopentyl radical, and the cycloheptyl radical.

Preferred examples of radicals $R^x$ are the 2-butyl radical, the 3-methyl-2-butyl radical, the 3-methyl-2-pentyl radical, the 3-pentyl radical, the 2-hexyl radical, the 3-hexyl radical, the 2-heptyl radical, the 2-octyl radical, the 1-phenylethyl radical, the 1-phenyl-1-propyl radical, the 2,2-dimethyl-1-propyl radical, the 1,1-dimethylethyl radical, the 1,1-dimethylpropyl radical, the cyclohexyl radical, and the 3,3,5-trimethylcyclohexyl radical.

Particularly preferred examples of radicals $R^x$ are the 2-butyl radical, the 3-methyl-2-butyl radical, the 3-methyl-2-pentyl radical, the 3-pentyl radical, the 2-hexyl radical, the 3-hexyl radical, the 2-heptyl radical, the 2-octyl radical, the 2,2-dimethyl-1-propyl radical, the 1,1-dimethylethyl radical, the 1,1-dimethylpropyl radical, the cyclohexyl radical, and the 3,3,5-trimethylcyclohexyl radical.

Examples of substituted radicals $R^x$ are —$C(CH_3)_2$—$CH_2$—$NH_2$, —$CH(CH_3)$—$CH_2$—$NH_2$, —$CH(C_2H_5)$—$CH_2$—$NH_2$, —$C(CH_3)_2$—$CH_2$—$NH$—$CH_2$—$CH_2$—$NH_2$, —$CH(CH_3)$—$CH_2$—$NH$—$CH_2$—$CH_2$—$NH_2$, —$CH(C_2H_5)$—$CH_2$—$NH$—$CH_2$—$CH_2$—$NH_2$, —$C(CH_3)_2$—$CH$=$CH_2$, —$CH(CH_3)$—$CH$=$CH_2$, —$CH(C_2H_5)$—$CH$=$CH_2$, —$C(CH_3)_2$—$C$≡$CH$, —$CH(CH_3)$—$C$≡$CH$, —$CH(C_2H_5)$—$C$≡$CH$, and glycidyl radical.

Preferably, the indices a, b, b', c, c', c''', d, d', d'', d''' in formula (I) are each independently a number within a range from 0 to 500, preferably within a range from 0 to 100, in particular within a range from 0 to 50, particularly preferably within a range from 0 to 10, with the proviso that the sum of the indices is at least 2.

The silicates according to the invention may be produced for example by hydrolysis of compounds (=chlorosilanes, alkoxychlorosilanes or alkoxysilanes) of general formula (II)

$(R^xO)_mCl_{4-m}Si$              (II), where m=0, 1, 2, 3 or 4, optionally in the presence of alcohols of formula $R^yOH$, or by alcoholysis of the compounds $(R^yO)_4Si$ with $R^xOH$ and water, wherein the radicals $R^x$ are each independently selected from radicals that meet one of the conditions specified for $R^x$ in formula (I), and where the radicals $R^y$ are each selected from the group consisting of (i) hydrogen, (ii) methyl radical, and (iii) ethyl radical.

A further option for preparing the alkyl silicates of the invention is to react oligomeric or polymeric methoxy or ethoxy silicates with alcohols $R^xOH$, optionally in the presence of a catalyst, wherein the radical $R^x$ is selected from radicals that meet one of the conditions specified for $R^x$ in formula (I). Examples of suitable catalysts are alkali metal hydroxides, such as KOH, or sodium methoxide.

The compounds according to the invention are hydrophobic, as demonstrated by hydrophobicity tests, and have low surface tension. Compounds where $R^y$=hydrogen and that still have $R^y$ contents of up to 9 mol %, based on the molar amount of the sum of all radicals $R^x$ and $R^y$, are hydrophobic.

The compounds are in addition stable to hydrolysis and thermally stable. For example, no condensation of Si—OH groups to Si—O—Si was observed at 140° C.

The compounds according to the invention are stable and hydrophobic, especially when $R^y$=hydrogen is not more than 5 mol %, more preferably when $R^y$ is a methyl or ethyl radical.

In addition, the compounds according to the invention can be prepared in simple ways, they have silicone-like low surface tensions and low glass transition temperatures and may in particular be used in areas where silicones are used, for example in waterproofing, defoamers, textiles, cosmetics, building protection, and household care.

EXAMPLES

Measurement Methods:

The molar proportions of the groups $R^x$ and $R^y$ are determined via $^1$H-NMR spectroscopy by integrating the characteristic O—$CH_2$—$CH_3$, O—$CH_3$ and —OH groups.

The composition of the ethyl silicates used and of the products formed was determined by $^{29}$Si-NMR spectroscopy.

The surface tension γ was determined at 20° C. using the hanging-drop method.

The glass transition temperature was determined by differential thermal analysis.

The dynamic viscosity n was determined at 20° C. using a Stabinger SVM3000 rotational viscometer from Anton Paar.

The hydrophobicity test was carried out as follows: A cementitious plasterboard was coated twice in succession with the prepared alkyl silicates. After 2 hours, a drop of the alkyl silicate was placed on the coated plasterboard and the change in the shape of the drop was monitored at room temperature after application.

Assessment: 0 (droplet spreads, no hydrophobicity), + (droplet becomes somewhat flatter, good hydrophobic behavior), ++ (droplet remains unchanged, very good hydrophobicity).

Silicate TES 34, an ethyl silicate having an $SiO_2$ content of 34% by weight, is prepared by hydrolytic condensation of 850 g of tetraethoxy silicate with 38 g of water in the presence of ethanol and HCl.

Example 1: Preparation of an Alkyl Silicate Containing 92 Mol % of 2,2-Dimethyl-1-Propyl Groups and 8 Mol % of Hydrogen Groups 10.4 g (118 mmol) of 2,2-dimethyl-1-propanol was dissolved in 56 g of methyl tert-butyl ether and treated with 9.8 g of pyridine. This solution was added dropwise, with stirring, over a period of 40 minutes to a solution of 10.0 g (59.1 mmol) of silicon tetrachloride in 27 g of methyltert-butyl ether, maintaining the temperature within a range from $-15°$ C. to $-5°$ C., and rinsed with 15 g of methyl tert-butyl ether. The reaction is allowed to react further for 1 hour with stirring, allowed to warm to room temperature, filtered, and the clear reaction solution treated at room temperature with a mixture of 9.8 g of pyridine and 1.04 g of water. The mixture is allowed to stand overnight, filtered again, and the solution is evaporated under reduced pressure, affording 10.4 g of product, which contains 92 mol % of 2,2-dimethyl-1-propyl groups ($R^x$=2,2-dimethyl-1-propyl) and 8 mol % of hydrogen groups ($R^y$=H).

$T_g$=$-27°$ C.

Example 2: Preparation of an Alkyl Silicate Containing 92 Mol % of 2-Butyl Groups and 8 Mol % of Hydrogen Groups A solution of 26.2 g (353 mmol) of 2-butanol, 29.2 g (369 mmol) of pyridine, and 145 g of methyltert-butyl ether was added dropwise, with stirring, over a period of 1 hour to a solution of 30.0 g (177 mmol) of silicon tetrachloride in 216 g of methyl tert-butyl ether, maintaining the temperature within a range from $-15°$ C. to $-5°$ C., and the mixture was stirred for a further 2.5 hours without cooling. The reaction mixture is filtered and MTBE is distilled off at standard pressure. The residue consists of a mixture of chloroalkoxysilanes, which is fractionally distilled under reduced pressure at 13 15 mbar. The product fraction having a boiling point of 80-82° C., which consists of $Cl_2Si[O(2-Bu)]_2$ and $ClSi[O(2-Bu)]_3$, is diluted with methyl tert-butyl ether, treated with a mixture of 6.8 g of pyridine and 0.84 g of water, and stirred overnight. It is filtered and methyl tert-butyl ether removed under reduced pressure. The residue consists of an alkyl silicate containing 92 mol % of 2-butyl groups ($R^x$=2-butyl) and 8 mol % of hydrogen groups ($R^y$=H).

$T_g$=$-124°$ C., $\eta$=48.6 mPa·s, $\gamma$=17.4 mN/m.

The hydrogen group content was unchanged after heating the product at 140° C. for 2 h.

A cementitious plasterboard was impregnated with the prepared product and showed water-repellent (hydrophobic) properties. The hydrophobicity value is: +.

Example 3: Preparation of an Alkyl Silicate Containing 85 Mol % of 2-Butyl Groups and Mol % of Ethyl Groups 150 g of Wacker® Silicate TES 40 WN, an ethyl silicate containing approx. 40% by weight of $SiO_2$ and 60% by weight of ethyl groups, formula I where $R^x$=$R^y$=ethyl and the relative ratio a:(b+b'):(c+c'+c"):(d+d'+d"+d''')=1:19:42:38 is treated with 360 g of 2-butanol and 0.15 g of sodium methoxide. The ethanol that forms is slowly distilled off via a 40 cm packed column. After the excess 2-butanol has been removed, the residue is neutralized by treatment with ammonium chloride and filtered. It consists of an alkyl silicate containing 85 mol % of 2-butyl groups ($R^x$=2-butyl) and 15 mol % of ethyl groups ($R^y$=ethyl) and the relative ratio a:(b+b'):(c+c'+c"):(d+d'+d"+d")=1:16:42:40.

$T_g$=$-130°$ C., $\eta$=23.2 mPa·s, $\gamma$=22.3 mN/m.

A cementitious plasterboard was impregnated with the prepared product and showed very good water-repellent (hydrophobic) properties. The hydrophobicity value is: ++.

For comparison, the hydrophobicity value of the Wacker® Silicate TES 40 WN used is: 0.

The hydrophobicity value of a trimethylsiloxy-terminated polydimethylsiloxane having a viscosity of approximately 35 mPa·s is for comparison: ++.

Example 4: Preparation of an Alkyl Silicate Containing 75 Mol % of 2-Butyl Groups, Mol % of 2,2-Dimethyl-1-Propyl Groups, and 8 Mol % of Ethyl Groups 78.3 g of silicate TES 34 [formula I where $R^x$=$R^y$=ethyl and the relative ratio a:(b+b'):(c+c'+c"):(d+d'+d"+d")=0:3:23:74] is reacted with 153 g of 2-butanol as described in example 3. The alkyl silicate formed contains 87 mol % of 2-butyl groups and 13 mol % of ethyl groups ($R^y$=ethyl).

21 g of this alkyl silicate is heated with 16.1 g of 2,2-dimethyl-1-propanol to 130-190° C., during which ethanol, 2-butanol, and finally excess 2,2-dimethyl-1-propanol are removed via a packed column. The residue is treated with ammonium chloride and filtered. It consists of an alkyl silicate containing 75 mol % of 2-butyl groups ($R^x$=2-butyl), 15 mol % of 2,2-dimethyl-1-propyl groups ($R^x$=2,2-dimethyl-1-propyl), and 8 mol % of ethyl groups ($R^y$=ethyl).

$T_g$=$-134°$ C., $\eta$=6.65 mPa·s, $\gamma$=19.4 mN/m.

The hydrophobicity value is: ++.

Example 5: Preparation of an Alkyl Silicate Containing 3,3,5-trimethylcyclohexyl Groups A flask is charged with 190.2 g (1.34 mol) of 3,3,5-trimethylcyclohexanol, 83.8 g (1.09 mol) of Wacker® Silicate TES 40 WN, (contains 1.09 mol of ethoxy groups) and 81 mg of sodium methoxide. The ethanol formed during the reaction is distilled off, the bottoms temperature increasing to 200° C. in the course of the reaction.

The excess 3,3,5-trimethylcyclohexanol is distilled off at 45 mbar, a bottoms temperature of 135° C., and an overhead temperature of 110° C. The product is obtained as a colorless liquid according to formula I where $R^x$=3,3,5-trimethylcyclohexyl radical, $R^y$=ethyl, $R^x$:$R^y$=99.8:0.2 and the relative ratio a:(b+b'):(c+c'+c"):(d+d'+d"+d''')=1:28:33:38.

$T_g$=$-43°$ C., $\eta$=2.46 mPa·s.

Example 6: Stability to Hydrolysis 4.03 g of the product from example 3 (containing 34.5 mmol of bonded 2-butyl groups and 6.13 mmol of bonded ethyl groups) is treated with 4.00 g (200 mmol) of $D_2O$ and 97.1 mg (1.18 mmol) of anhydrous sodium acetate and the two-phase mixture is stirred at 23-25° C. in a sealed flask. The water phase has a pH of 7.5. The content of 2-butanol and ethanol in the $D_2O$ phase is after 51 days determined by $^1$H-NMR spectroscopy and comprises 35 µmol (approx. 1 mol % based on bonded butyl groups) of 2-butanol and 4.77 µmol (approx. 0.08 mol % of ethanol based on bonded ethyl groups).

Example 7: Stability to Hydrolysis 4.97 g of the product from example 5 is treated with 5.06 g (200 mmol) of water (pH 7.0) and the mixture stirred at 23-25° C. for 19 days. The mixture is extracted with dichloromethane. The content of 3,3,5-trimethylcyclohexanol is determined by gas chromatography using naphthalene as a standard. The content of 3,3,5-trimethylcyclohexanol is 0.16%.

Example 8: Stability to Hydrolysis

The reaction in example 7 is repeated using 220 mg of Tonsil® (acid-activated bleaching earth). The content of 3,3,5-trimethylcyclohexanol is 0.67 mol %.

Example 9: Stability to Hydrolysis

The reaction in example 7 is repeated using 2.08 g of sodium acetate, resulting in a PH of 8.8. The content of 3,3,5-trimethylcyclohexanol is 0.29 mol %.

The invention claimed is:

1. An alkyl-silicate-containing organosilicon compound, comprising:
    wherein the alkyl-silicate-containing organosilicon compound comprises at least 90% by weight, preferably at least 95% by weight, of alkyl silicates of average formula (I)

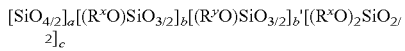

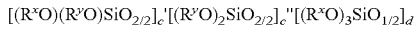

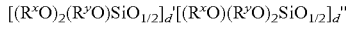

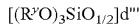 (I);

wherein the indices a, b, b', c, c', c", d, d', d", d''' indicate the average content of the respective structural unit in the compound and are each independently a number within a range from 0 to 100 000, and wherein the sum of the indices is at least 2;
    wherein the radicals $R^x$ are each independently selected from radicals that meet at least one of the following conditions:
    (a) $R^x$ is a substituted or unsubstituted, $C_4$-$C_{20}$ hydrocarbon radical that is branched at the α-carbon atom,
    (b) $R^x$ is a substituted or unsubstituted, $C_5$-$C_{20}$ hydrocarbon radical that is doubly branched at the β-carbon atom, and/or
    (c) $R^x$ is an unsubstituted or alkyl-substituted cyclopentyl, cyclohexyl or cycloheptyl radical having a total of not more than 9 carbon atoms;
    wherein substituted in each case means that the hydrocarbon radical has at least one functional group selected from the group consisting of vinyl radical, ethynyl radical, amino radical, epoxy radical, thiol radical, and carbinol radical;
    wherein the radicals $R^y$ are each independently selected from the group consisting of (i) hydrogen, (ii) methyl radical, and (iii) ethyl radical;
    wherein the molar proportion of all radicals $R^y$ in the silicate is within a range from 1 to 15 mol %;
    wherein the molar proportion for $R^y$=(i) hydrogen is not more than 9 mol %, in each case based on the molar amount of the sum of all radicals $R^x$ and $R^y$; and
    wherein the alkyl-silicate-containing organosilicon compounds contain no SiC-bonded radicals.

2. The alkyl-silicate-containing organosilicon compound of claim 1, wherein the radicals $R^y$ are each independently a (ii) methyl radical or (iii) ethyl radical.

3. The alkyl-silicate-containing organosilicon compound of claim 1, wherein the radicals $R^x$ are each independently selected from radicals that meet one of the following conditions:
    (a) $R^x$ is a substituted or unsubstituted, aliphatic $C_4$-$C_{10}$ hydrocarbon radical that is branched at the α-carbon atom,
    (b) $R^x$ is a substituted or unsubstituted, aliphatic $C_5$-$C_{10}$ hydrocarbon radical that is doubly branched at the β-carbon atom, and
    (c) $R^x$ is an unsubstituted or alkyl-substituted cyclohexyl radical having a total of not more than 9 carbon atoms.

4. The alkyl-silicate-containing organosilicon compound of claim 1, wherein the radicals $R^x$ are selected from the group consisting of 2-butyl radical, 3-methyl-2-butyl, 3-methyl-2-pentyl, 3-pentyl radical, 2-hexyl radical, 3-hexyl radical, 2-heptyl radical, 2-octyl radical, 1-phenylethyl radical, 1-phenyl-1-propyl radical, 2,2-dimethyl-1-propyl radical, 1,1-dimethylethyl radical, 1,1-dimethylpropyl radical, cyclohexyl radical, and 3,3,5-trimethylcyclohexyl radical.

5. The alkyl-silicate-containing organosilicon compound of claim 1, wherein the indices a, b, b', c, c', c", d, d', d", d''' are each independently a number within a range from 0 to 500, and wherein the sum of the indices is at least 2.

6. The alkyl-silicate-containing organosilicon compound of claim 1, wherein the indices a, b, b', c, c', c", d, d', d", d''' are each independently a number within a range from 0 to 10, and wherein the sum of the indices is at least 2.

7. An alkyl silicate, comprising:
    wherein the alkyl silicate has the average formula (I)

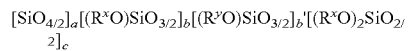

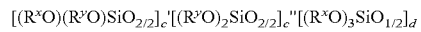

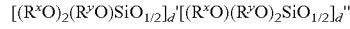

 (I);

wherein the indices a, b, b', c, c', c", d, d', d", d''' indicate the average content of the respective structural unit in the compound and are each independently a number within a range from 0 to 100 000, wherein the sum of the indices is at least 2;
    wherein the radicals $R^x$ are each independently selected from radicals that meet at least one of the following conditions:
    (a) $R^x$ is a substituted or unsubstituted, $C_4$-$C_{20}$ hydrocarbon radical that is branched at the α-carbon atom,
    (b) $R^x$ is a substituted or unsubstituted, $C_5$-$C_{20}$ hydrocarbon radical that is doubly branched at the β-carbon atom, and/or
    (c) $R^x$ is an unsubstituted or alkyl-substituted cyclopentyl, cyclohexyl or cycloheptyl radical having a total of not more than 9 carbon atoms;
    wherein substituted in each case means that the hydrocarbon radical has at least one functional group selected from the group consisting of vinyl radical, ethynyl radical, amino radical, epoxy radical, thiol radical, and carbinol radical;

wherein the radicals $R^y$ are each independently selected from the group consisting of (i) hydrogen, (ii) methyl radical, and (iii) ethyl radical;

wherein the molar proportion of all radicals $R^y$ in the silicate is within a range from 1 to 15 mol %; and wherein the molar proportion for $R^y$=(i) hydrogen is not more than 9 mol %, in each case based on the molar amount of the sum of all radicals $R^x$ and $R^y$.

8. The alkyl silicate of claim 7, wherein the radicals $R^y$ are each independently a (ii) methyl radical or (iii) ethyl radical.

9. The alkyl silicate of claim 7, wherein the radicals $R^x$ are each independently selected from radicals that meet one of the following conditions:

(a) $R^x$ is a substituted or unsubstituted, aliphatic $C_4$-$C_{10}$ hydrocarbon radical that is branched at the α-carbon atom, (b) $R^x$ is a substituted or unsubstituted, aliphatic $C_5$-$C_{10}$ hydrocarbon radical that is doubly branched at the β-carbon atom, and (c) $R^x$ is an unsubstituted or alkyl-substituted cyclohexyl radical having a total of not more than 9 carbon atoms.

10. The alkyl silicate of claim 7, wherein the radicals $R^x$ are selected from the group consisting of 2-butyl radical, 3-methyl-2-butyl, 3-methyl-2-pentyl, 3-pentyl radical, 2-hexyl radical, 3-hexyl radical, 2-heptyl radical, 2-octyl radical, 1-phenylethyl radical, 1-phenyl-1-propyl radical, 2,2-dimethyl-1-propyl radical, 1,1-dimethylethyl radical, 1,1-dimethylpropyl radical, cyclohexyl radical, and 3,3,5-trimethylcyclohexyl radical.

11. The alkyl silicate of claim 7, wherein the indices a, b, b', c, c', c'', d, d', d'', d''' are each independently a number within a range from 0 to 500, and wherein the sum of the indices is at least 2.

12. The alkyl silicate of claim 7, wherein the indices a, b, b', c, c', c'', d, d', d'', d''' are each independently a number within a range from 0 to 10, and wherein the sum of the indices is at least 2.

* * * * *